(12) United States Patent
Day et al.

(10) Patent No.: US 8,882,996 B2
(45) Date of Patent: Nov. 11, 2014

(54) MICRO-STRUCTURE-BASED ADHESIVES FOR SIZE-SELECTIVE PARTICLE TRAPPING AND SORTING

(71) Applicant: The Board of Trustees of the Leland Stanford Junior University, Palo Alto, CA (US)

(72) Inventors: Paul S Day, Menlo Park, CA (US); Mark R Cutkosky, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 35 days.

(21) Appl. No.: 13/866,774

(22) Filed: Apr. 19, 2013

(65) Prior Publication Data

US 2013/0277278 A1    Oct. 24, 2013

Related U.S. Application Data

(63) Continuation-in-part of application No. 13/451,713, filed on Apr. 20, 2012.

(60) Provisional application No. 61/635,973, filed on Apr. 20, 2012.

(51) Int. Cl.
| | |
|---|---|
| *B07B 13/00* | (2006.01) |
| *B29C 33/38* | (2006.01) |
| *B29C 33/42* | (2006.01) |
| *B29C 33/52* | (2006.01) |
| *B29C 37/00* | (2006.01) |
| *B29C 39/00* | (2006.01) |
| *B08B 7/00* | (2006.01) |
| *B82B 3/00* | (2006.01) |

(52) U.S. Cl.
CPC .............. *B07B 13/00* (2013.01); *B29C 33/3857* (2013.01); *B29C 33/424* (2013.01); *B29C 33/52* (2013.01); *B29C 37/0053* (2013.01); *B29C 39/006* (2013.01); *B08B 7/0028* (2013.01); *B82B 3/0071* (2013.01)
USPC ............................................................ 209/45

(58) Field of Classification Search
USPC .................................................... 209/45, 931
See application file for complete search history.

(56) References Cited

U.S. PATENT DOCUMENTS

| | | | | |
|---|---|---|---|---|
| 2,736,721 | A * | 2/1956 | Dexter | 525/475 |
| 4,839,033 | A * | 6/1989 | Sano et al. | 209/4 |
| 6,376,256 | B1 * | 4/2002 | Dunnington et al. | 506/30 |
| 6,697,152 | B2 * | 2/2004 | Batchelder | 356/237.1 |
| 7,727,915 | B2 * | 6/2010 | Skirius et al. | 442/389 |
| 2003/0040119 | A1 * | 2/2003 | Takayama et al. | 436/63 |
| 2009/0012218 | A1 * | 1/2009 | Kuroda | 524/165 |
| 2012/0295068 | A1 * | 11/2012 | Cutkosky et al. | 428/167 |
| 2013/0291323 | A1 * | 11/2013 | Heilian et al. | 15/104.94 |
| 2014/0248458 | A1 * | 9/2014 | Sherman et al. | 428/41.8 |

* cited by examiner

*Primary Examiner* — Joseph C Rodriguez
(74) *Attorney, Agent, or Firm* — Lumen Patent Firm (57) ABSTRACT

A method of separating particles is provided that includes exposing a selective PDMS adhesive to a particle-contaminated surface, where the selective PDMS adhesive captures particles present on the particle-contaminated surface to form a fouled selective PDMS adhesive, and exposing the fouled selective PDMS adhesive to a PDMS transfer sheet, where particles outside of a desired range are transferred over to the PDMS transfer sheet, where the fouled selective PDMS adhesive retains only the particles of a desired range.

10 Claims, 6 Drawing Sheets

Before Transfer
(a)

After Transfer
(b)

MICRO-STRUCTURE-BASED ADHESIVES FOR SIZE-SELECTIVE PARTICLE TRAPPING AND SORTING

CROSS-REFERENCE TO RELATED APPLICATIONS

This application claims priority from U.S. Provisional Patent Application 61/635,973 filed Apr. 20, 2012, which is incorporated herein by reference. This application is a continuation-in-part of U.S. patent application Ser. No. 13/451,713 filed Apr. 20, 2012, which is incorporated herein by reference.

FIELD OF THE INVENTION

This invention relates to adhesives. In particular, the invention relates to adhesives for particle trapping and sorting.

BACKGROUND OF THE INVENTION

Particle separation and sorting is a common practice in which particulate matter of a variety of shapes and sizes are categorized based on the physical attributes of the individual particles. Commonly, this is accomplished through the use of sieves. Similar to the common household kitchen tool, industrial sieves of will often be stacked on top of one another with the largest mesh size at the top, such that as particles fall down they are eventually caught in the increasingly fine stages of the mesh. This process, while quite standard in industry, suffers from a few drawbacks. First, it relies on multiple levels of sieves for each particular size range. As one might imagine, as particle sizes of interest approach diameters on the order of tens of micrometers, fabrication of these wire-mesh devices can become costly and difficult. Additionally, with wire meshes of this size, fragility becomes an issue and the devices are easily damaged. Second, the devices rely on a gravitational field to be effective. The presence of such a field may be a safe assumption in the vast majority of cases, but in the case of space exploration it is not. For a rover on a distant planet, moon, or even asteroid, gravity cannot be relied upon to aid in particle sorting for scientific analysis.

In another attempt to address the needs for particle sorting, particles of different sizes were accelerated through inkjet nozzles and, after a charging step, were able to efficiently sort particles based on their size. However, this method was inherently limited in terms of the particle size because of the size of the inkjet nozzle orifice. In another attempt, AC electric fields were used to charge and convey particles around a 2D surface. Using electrodes patterned on the planar surface, particles sitting on a thin insulating layer could be effectively conveyed, smoothed, or sorted by varying the applied electric fields.

Additionally, multiple attempts include methods based on dielectrophoresis were used. In these attempts, dielectric particles were sorted by the application of electric fields to flows containing particles in microfluidic channels. This sorting can be done continuously, but requires that the particles be suspended in a fluid flow. In a further attempt a solution based on pressure driven flow combined with electro-osmosis was presented. Using a multi channeled microfluidic device, particles or cells from a single channel were sorted into one of two channels electrically and, once separated, were carried away from the sorting area by pressure driven flow. Non-electric micro-fluidic processes have also been attempted that include a particle separation device that relies only on gravity. This allowed for the separation of particles as they flowed horizontally due to the fact that the more massive particles would descend further as the flow traveled over a specified distance due to the graviational field, allowing them to be isolated after sufficient physical separation had occurred for separating particles without the aid of an electrical field or gravity. The process began by suspending particles in a fluid and forcing the fluid to flow through a micro-fluidic main channel. Off of a main channel were perpendicular channels into which the flow of fluid was controlled. By regulating the flow rate into the side channels, the size of particles were controlled that would be drawn in to them as they moved through the main channel, thus allowing the particles to be sorted based on their size.

In yet another attempt, a magnetically driven micro-tool for sorting particles. A MEMS device was fabricated that was actuated on a rotational joint, allowing it to take on one of two positions. Each of the positions would divert the flow of particles and suspending liquid to a separate channel. By actively controlling the tool, particles suspended in a liquid could be sorted in a binary fashion.

Each of these solutions, however, requires a complex device or devices as well as input energy. Previously, these requirements were of little import as the majority of particle separation and sorting work was done in industrial or laboratory environments where these resources were available.

What is needed is a method of separating particles in the field, without large pieces of equipment for separation conducted in an extreme or remote environment where power is at a premium and gravity and human interaction cannot be relied upon, a sufficiently low-cost, low-complexity, method must be developed.

SUMMARY OF THE INVENTION

To overcome the teachings in the art, a method of separating particles is provided that includes exposing a selective PDMS adhesive to a particle-contaminated surface, where the selective PDMS adhesive captures particles present on the particle-contaminated surface to form a fouled selective PDMS adhesive, and exposing the fouled selective PDMS adhesive to a PDMS transfer sheet, where particles outside of a desired range are transferred over to the PDMS transfer sheet, where the fouled selective PDMS adhesive retains only the particles of a desired range.

According to another aspect of the invention, the PDMS transfer sheet includes a bulk PDMS material. In one aspect the bulk PDMS material comprises a flat sheet of the bulk PDMS material.

According to a further aspect of the invention, the selective PDMS adhesive includes a PDMS micro-structure, where the PDMS micro-structure has rows of wedge-shape features. In one aspect the wedge-shape features have a height to base aspect ratio in a range of 1:1 to 5:1. Here, the wedge-shape features comprise a height in a range of 1 µm to 1 mm. In another aspect the wedge-shape features has a triangular cross-section shape that can include an isosceles, right-isosceles, right, acute or equilateral. In a further aspect, the wedge-shape features have a height in a range of 1 µm to 1 mm. In yet another aspect, the base of the wedge-shape feature in one row is proximal to a base of the wedge-shape feature in an adjacent the row of the wedge-shape features. Here, a separation between the adjacent bases of the wedge-shape features is in a range of 0 to 1 mm.

DETAILED DESCRIPTION

Highly reusable and inexpensive adhesives are designed to trap and selectively maintain particulate matter based on the size of the particles. The adhesives can be engineered, based on micro-structure size and design, to retain particles below a certain size range while allowing others to easily be stripped away from the adhesives making devices according to embodiments of the invention useful of particle characterization and sorting. The adhesives utilize a wedge shaped microstructure manufactured with a micromachining technique by the inventors.

The shape of the micro-structure as well as the material from which the adhesives are made allow the adhesives to collect particulate matter of all sizes from for example a contaminated structure. Subsequently, a flat sheet of the same material as the adhesive (PDMS silicone polymer) can be applied to the contaminated adhesive and particles above a critical size limit will be removed. This leaves only particles of the desired size range on the micro-structured adhesive.

Embodiments of the invention can be applied in industrial laboratory environments for particle capture, sorting and analysis. Additionally, they can be used in analysis of particulate matter in the field, without large pieces of equipment that are typically used to perform the same function, such as industrial sieve.

Embodiments of the invention present a number of advantages over other particle sorting technologies. In terms of particle capture, the adhesives are superior to conventional sticky tapes or filters in that the particulate matter are removed or sorted using the adhesive, and the particles can be recovered if desired. For particle sorting, the adhesives present a very low cost, lightweight, passive alternative to bulky, expensive sieves that rely on gravity and hence are no ideal for, for example, space applications.

A selective adhesive, or an adhesive with the ability to selectively adhere to particulate matter of certain size ranges while rejecting other particles is provided that is solution to the above mentioned and inherent shortcomings of the sieve. According to one embodiment, the invention either entirely rejects particles over a certain size limit, or at least allow for the easy removal of such particles from the adhesive. Additionally, the invention is robust, such as immune from damage due to casual handling or use of the adhesives, uncomplicated to use, passive, and has the potential for many additional usage cycles. Further, according to one embodiment, the adhesive allows for the removal or transfer of the trapped particles without undue effort, should it be required that the particles be removed from the adhesive for analysis or use.

The selective adhesives in the current invention rely on a two-step method for separating particles. In the first step, the selective adhesive is exposed to a particle contaminated surface, capturing the particles present on the surface, where in one embodiment, all of the particles are captured. In the second step, the fouled selective adhesive is exposed to a flat transfer sheet of the same PDMS material that the selective adhesives are made of. In this step, particles outside of the desired range are transferred over to the flat sheet and the selective adhesives is left only with particles of the desired type. A graphical description of the process can be found in FIGS. 1a-1f showing in step one, the selective adhesive is placed above a contaminated surface. In step two, the adhesive is exposed to the contaminated surface with a certain amount of pressure. In step three, the adhesive is removed, along with all of the contamination. In step four, the substrate is replaced with a piece of at PDMS, the same material used to cast the selective adhesive features. In step five, the contaminated features are exposed to the flat at PDMS. In the final step, the adhesive is removed from the flat PDMS, leaving behind particles that are outside the selective adhesive's size range.

Figure 1:
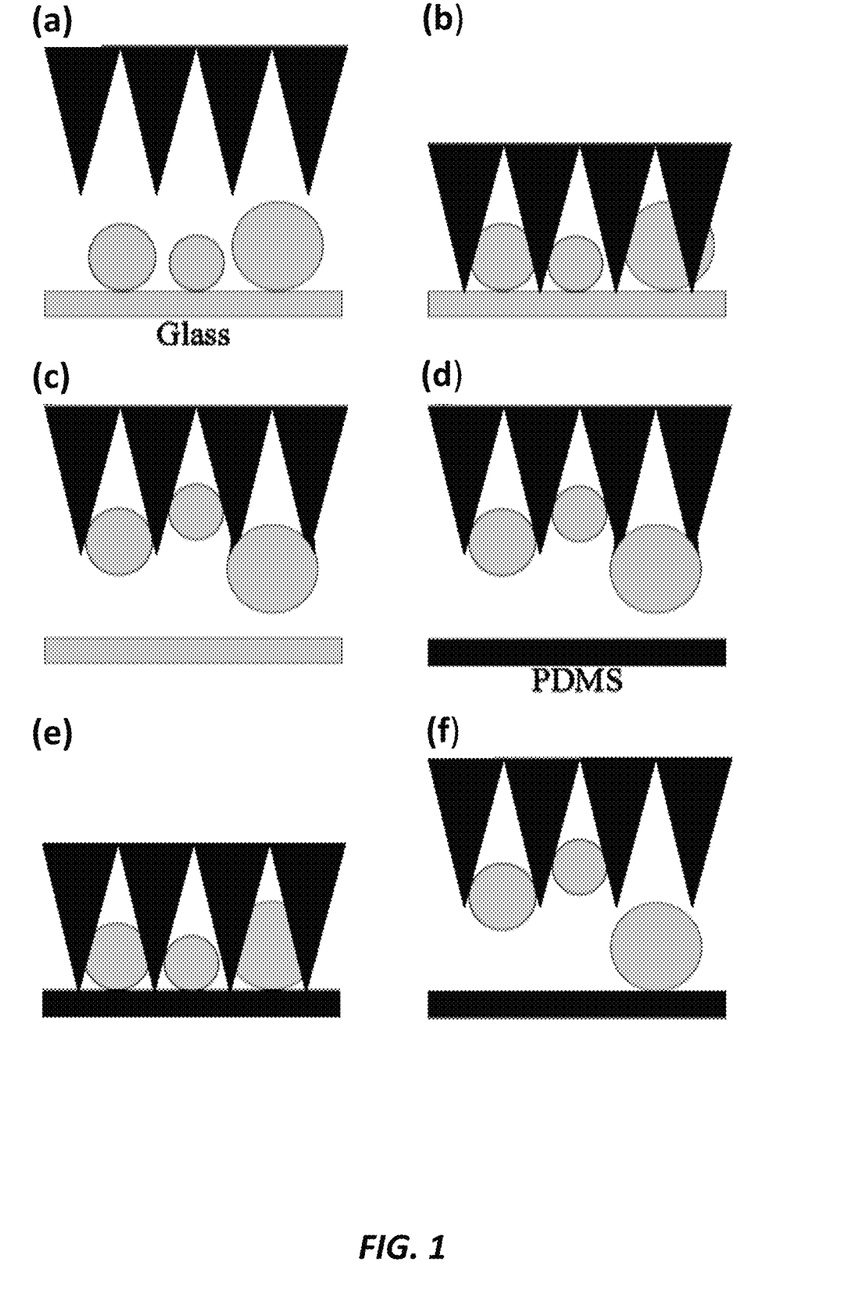
FIGS. 1a-1f show the method of separating particles, according to one embodiment of the invention.
Figure 2:
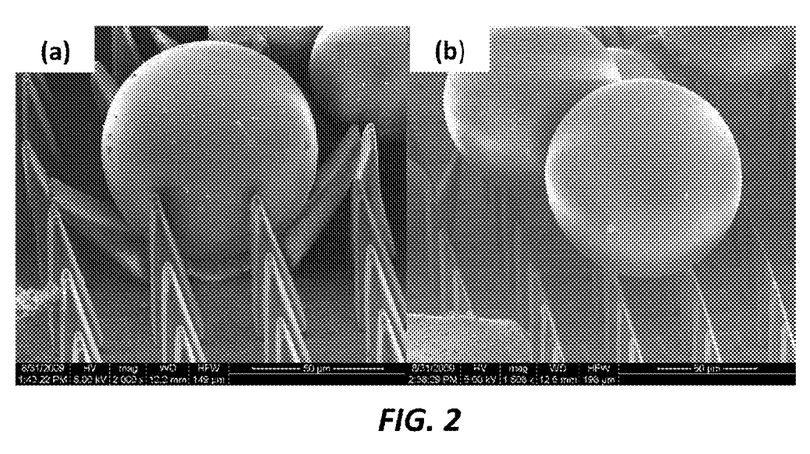
FIGS. 2a-2b show SEM micrographs of two attachment profiles, according to one embodiment of the invention.

The transfer step is necessary due to the fact that the PDMS material making up the selective adhesive is still somewhat tacky as a bulk material. This, combined with the extremely small mass of the particles of interest, provides size-independent particle retention by the selective adhesives. By introducing the transfer step, it is ensured that only particles strongly arrested by the micro-structure are retained. Particles that are too large or that are trivially attached are removed during this step. A trivial attachment is one in which contact between the particle and the micro-structure occurred only at the feature tips or other, comparably small, areas. An example of such attachment can be seen in FIG. 2b, where FIGS. 2a-2b show SEM micrographs of two attachment profiles. In FIG. 2a, the particle has embedded itself deeply between two wedges. In FIG. 2a, a case of trivial attachment is shown, where the particles only makes contact with the tips of the features. However, due to the exceedingly small mass of the particle, it will remain attached to the adhesive unless removed during a transfer step.

According to further embodiments of the invention, the selective PDMS adhesive includes a PDMS micro-structure, where the PDMS micro-structure has rows of wedge-shape features. In one aspect the wedge-shape features have a height to base aspect ratio in a range of 1:1 to 5:1. Here, the wedge-shape features can have a height in a range of 1 μm to 1 mm. In another aspect the wedge-shape features has a triangular cross-section shape that can include an isosceles, right-isosceles, right, acute or equilateral. In a further aspect, the wedge-shape features have a height in a range of 1 μm to 1 mm. In yet another aspect, the base of the wedge-shape feature in one row is proximal to a base of the wedge-shape feature in an adjacent the row of the wedge-shape features. Here, a separation between the adjacent bases of the wedge-shape features is in a range of 0 to 1 mm.

Figure 3:
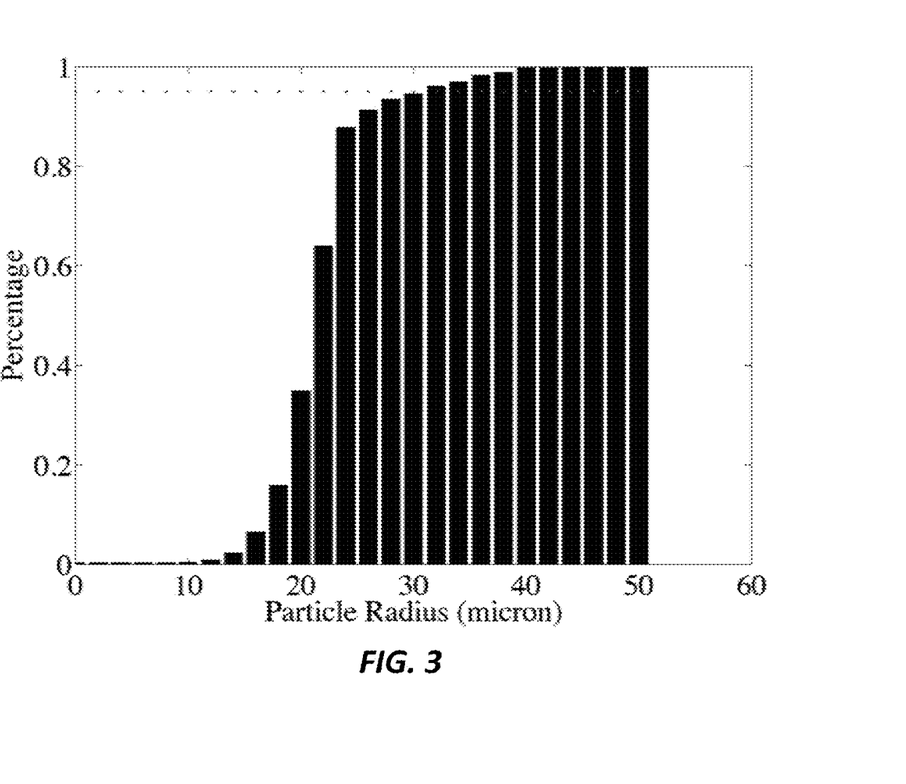
FIG. 3 shows a graph of the selective adhesive performance of the wedgeshaped adhesives from the proof-of-concept testing, according to one embodiment of the invention.
Figure 4:
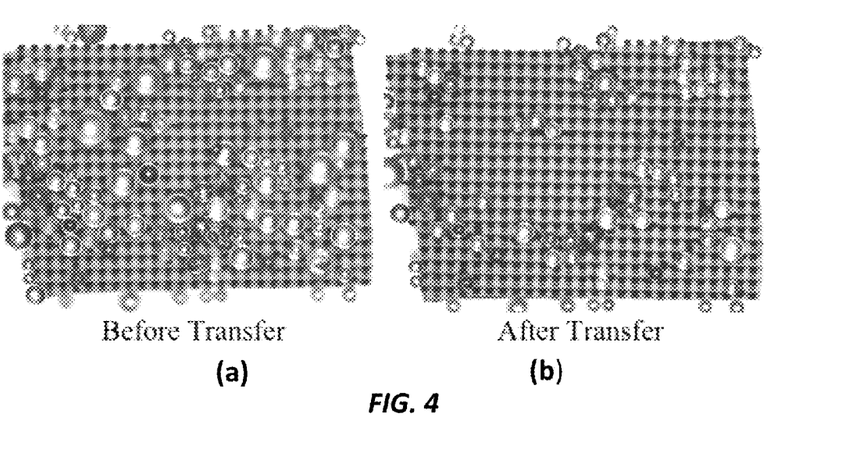
FIGS. 4a-4b show a side bye side image of a sample of the selective adhesive before and after the transfer step, according to one embodiment of the invention.

The results of exemplary selective adhesion experiments conducted with a square based wedge adhesive embodiment are summarized in FIG. 3. The figure represents the results of over 60 individual expose-transfer experiments, involving over two thousand particles. Each bar represents the percentage of particles ultimately arrested by the micro-structure that are below the indicated size range. Each bar represents a 'bin' of particles two micrometers wide, with the lower bound equal to the x-axis value the bar is centered over. For example, the bar centered over 20 μm on the x-axis has a value of approximately 0.65, indicating that just under 65% of the particles retained by the micro-structure were less than 20-22 μm in radius. It can be seen that, as particle size increases, the number of particles remaining on the adhesive after the transfer step begins to reduce, with a sharp transition occurring just below a 30-32 micron particle radius. At the 30-32 micron particle radius bin, the percentage of particles ultimately arrested by the adhesive is 95%, where the dotted line represents the 95% point. As particle sizes increase further, fewer and fewer are retained by the micro-structure after the transfer step. Eventually, it can be seen that 100% of the particles arrested by the adhesive are below 42-44 microns in size. In FIGS. 4a-4b two images from the experiments can be seen. In FIG. 4a, the adhesive is shown before the transfer step. Here, it arrested a large number of particles over a wide size range. In FIG. 4b, the same sample can be seen after the transfer step of the experiments. As is expected, most of the larger particles have been removed from the adhesive. In the exemplary experiments, some larger particles remain and some of the smaller particles have also been removed, but the general selective behavior of the adhesive is apparent.

There were a number of reasons why a small number of these larger particles remained in the wedges while most other, similarly sized particles did not. One type of behavior, which often caused the retention of larger particles was when a such particle became lodged deeply in the region between four adjacent wedges. Another such behavior involved a large particle becoming embedded deeply between two individual wedges, an example of which can be seen in FIG. 2a.

A number of other, atypical contact schemes would also occasionally result in a larger than normal particle being retained by the micro-structure. The micro-structure design could be altered such that only one type of contact would be possible if the features were pressed with suitable force against a particle-contaminated surface. An adhesive with such a micro-structure, the design of which is described in detail below, should allow for more predictable behavior in terms of its interaction with particulates as well as improve the rate at which the transition from particle retention to particle rejection occurs.

With the insight gained from the proof-of-concept experiments, a micro-structure specifically for selective adhesion was designed. The design involves a few modifications to the square-based wedge design. First, the asymmetric nature of the micro-structure was removed in order to allow for a more predictable contact scheme. More specifically, instead of the right-triangular shape used in the directional adhesives, a right-isosceles triangular shape was chosen with a 40 μm base and an 80 μm micron height, effectively a mirroring of the directional adhesive micro-structure. This larger feature cross section would make it more difficult for large particles to become deeply embedded between two features, as mentioned previously, as the thicker, stiffer features would have a greater ability to repel the particle. Other triangular shapes can include isosceles, acute or equilateral. Additionally, instead of the square-base features, the selective features would be continuous in order to prevent a contact patch with a particle from abruptly ending if a particle was larger than the width of the feature. This modification would ensure particles could no longer be lodged within the empty region between four adjacent features, as mentioned above. A further profile could include a square-pyramidal shape. By addressing these specific symptoms of the square-based wedges in the design of the new selective adhesive, it was hoped that the poor transition-region performance could be improved.

The key to developing a viable selective adhesive is to understand how the particulate matter will interact with the micro-structure so that predictions can be made about which particles will be retained and which can be easily removed.

Because of the highly elastic nature of the polymers of which adhesives are comprised, it was necessary to be able to model the deflection of the micro-structures as they begin to interact with the particles. Additionally, one must take in to account the adhesive and frictional effects of the polymer feature interacting with the particle. Finally, one must model the adhesion of the transfer sheet of flat PDMS that is used to remove unwanted particles from the selective adhesive.

The adhesion model used to describe the interaction between the particulate matter and the polymer surface is described by the Johnson-Kendall-Roberts (JKR) model of elastic contact. The model used predicts the magnitude of the ultimate pull-off force of a spherical particle with surface energy $\gamma_1$ and the flat, polymeric half-space of surface energy $\gamma_2$ as:

$$P = -(3/2)\gamma_{12}\pi R \quad (1)$$

where $$\gamma_{12} = \sqrt{\gamma_1^2 + \gamma_2^2} \quad (2)$$

R is the radius of the particle, and P acts along a vector normal to the polymer surface. This formula will set the limit on the amount of vertical force the transfer sheet of flat PDMS will be able to apply on the particle it is contacting with during the transfer step.

Figure 5:
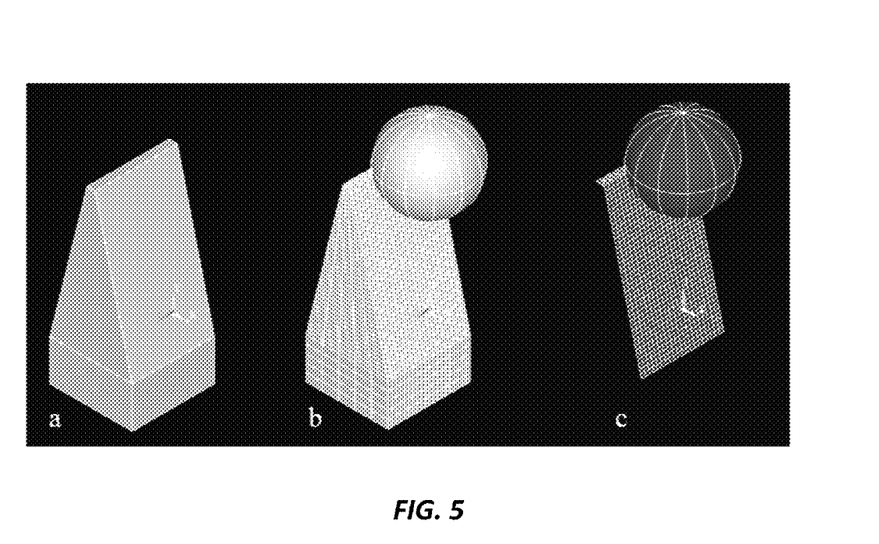
FIGS. 5a-5c show ANSYS models for contact between a selective feature and a spherical particle, according to one embodiment of the invention.

Finite element modeling of the micro-structure was conducted in the ANSYS finite-element modeling package. FIGS. 5a-5c show the ANSYS model for contact between a selective feature and a spherical particle, wherein FIG. 5a shows the unmeshed solid volume of the model of the selective feature, and the geometry of the model for a particle of diameter 20 μm. The wedge portion is an extruded isosceles triangle with a chamfered top, the bottom is a rectangular block. The feature was modeled by a continuous, isosceles, wedge with a 40 μm base width and 80 μm height. The interacting particle diameter determines how far the wedge extends in the depth-, or z-direction, so as not to have contact patches reach the edge of the feature. To ensure proper modeling of the reaction forces, the effect of modeling the particle contacting at the center of a feature with a depth of three times the particle diameter was also explored. This increase in depth was found to have a negligible (≤5%) effect on the predicted reaction forces so the smaller, single diameter deep section of the feature was modeled in order to save computational time. The sharp tips of the feature have been chamfered in order to avoid excessive penetration in the contact model as well as problems with poorly formed rectangular elements near the sharp tip. The feature is modeled as having a 20 μm thick backing layer, and it was found that increased backing layer thickness also had negligible effects on the solution. FIG. 5b shows the meshed model, including the spherical primitive element representing a particle of radiums 20 μm, and FIG. 5c shows the contact elements of the model. The wedge face is the contact surface while the particle if the rigid target surface. The particles interacting with the feature were modeled as a single, spherical, primitive element. More details on the specifics of this aspect of the model can be found below.

The previously described solid model was meshed entirely with ANSYS SOLID95 elements. These 3D structural elements are 20 node cubic elements with eight corner nodes and 12 mid-side nodes.

Mesh sizing of the model was done manually by dictating the number of divisions present on each of the sides of the 3D model. On the upper, wedge shaped portion of the model, there were 20 mesh divisions on the angled faces, as well as 20 mesh divisions in the z-, or depth-, direction. This number of divisions in the z-directions was fixed even as the dimension in the z-direction grew with particle diameter. The top, chamfered portion of the wedge was divided 5 times as was the bottom of the wedge to create continuous mesh lines.

The rectangular backing layer section was created separately from the upper wedge portion, and each edge of the section was assigned 5 mesh divisions in order for the meshing of the bottom and top sections to align. Once the sections were meshed individually, coincident nodes were merged, effectively joining the upper and lower parts of the model. A meshed view of the model can be seen in FIG. 5b.

After meshing, contact elements were overlaid on the single face of the wedge that would contact the modeled particle. ANSYS CONTA174 elements were chosen as these 8-node contact shell elements matched with the 8-node faces of the SOLID95 elements that made up the wedge. In addition to the contacting face of the wedge, the chamfered top of the wedge was also meshed with CONTA174 elements, in an attempt to avoid penetrations of the contact elements along the edge created by the contact face and the chamfered top of the wedge.

As previously mentioned, the particle interacting with the surface was modeled by a single, spherical, primitive element, of type TARGE170. This allowed for a rigid approximation of the particle, which is a valid assumption when modeling glass micro-spheres (E 50-90 GPa) interacting with a PDMS elastomer (E 0.875-1.75 MPa). Both the meshed contact surface as well as the spherical primitive can be seen in FIG. 5c.

The interaction of the particle and wedge was modeled using displacement constraints on the model. All but one of the faces of the backing layer section of the model was given a zero-displacement constraint in all degrees of freedom (DOF). These constraints simulate the assumed rigid behavior of the backing layer surrounding the section of the feature being modeled. The remaining face of the backing layer section, the one directly below the contact face, was constrained with a symmetry boundary condition as it is assumed that the particle will interact in a symmetric fashion with the two wedges it is interacting with as it is loaded into the channel created by two, adjacent wedges. This allows this particular face of the backing layer to flex in the y-z plane, but not in the x-direction. The particle, or the contact target, was assigned a pilot node on to which all DOF constraints were placed. The pilot node was constrained to zero displacement in the Z DOF and zero rotation in all DOF. In order to prevent penetration of the contact elements in to the wedge, two load steps were used.

In the first load step, the particle was moved from well outside of contact along a trajectory approximately normal to the angled face of the feature to an intermediate position. This position was approximately 10-15 μm above the bottom edge of the contacting face, depending on the size of the particle. The particle center is located directly above the edge of the modeled backing layer to maintain model symmetry. The 10-15 μm buffer height was used primarily to avoid penetration due to excessively high contact forces achieved by loading to physically unrealistic depths. Even with this buffer, the modeled depths are, in fact, far larger than any depth observed experimentally, so the results over the modeled load step should encompass the observed final positions of the particles in the experimental data. The second load step moved the particle purely in the positive y-direction until the particle had completely lost contact with the feature. Contact data was recorded during this step to examine the forces and load conditions as a particle was removed from a position deeply within the channel created by two adjacent wedges.

Figure 6:
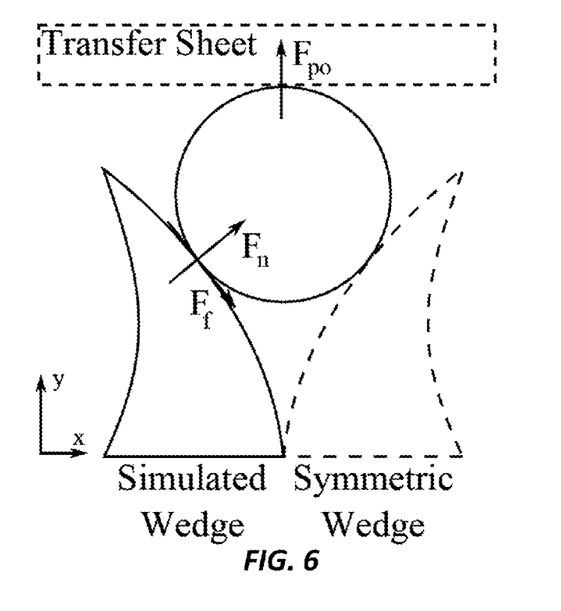
FIG. 6 shows a free body diagram of an example load condition in the described model, according to one embodiment of the invention.

The results taken from the ANSYS model included the contact normal force vector and position vector of each of the nodes in each of the contact elements. With this data, it was possible to determine the effective center of the contact patch by locating the element with the highest overall contact pressure. Additionally, one can calculate a vector sum of all of the contact pressure normal vectors to generate an effective contact force being applied to the particle from the wedge face. With the assumption of a simple Coulomb friction coefficient, an approximation of the interaction between the particle and the wedge at any of the sub-steps can be made. A free body diagram of the particle interaction model is shown in FIG. 6. For each simulation, the contact data described above was output at 20 evenly spaced sub-steps during the single displacement load step. As shown in FIG. 6, a free body diagram of an example load condition in the described model is provided. The normal force between the particle and the wedge, $F_n$ is output by the FEM model and the frictional force, $F_{po}$ is calculated based on simple Coulomb friction assumptions. The pull-off force, $F_{po}$ is also shown, representing the adhesive force applied to the particle during the transfer step of the selective adhesive process. If the magnitude of $F_{po}$ is greater than the sum of the magnitudes of the y-components of wedge reaction forces, the particle will detach from the micro-structure. Because of the symmetric nature of the loading of the wedges, only one wedge is simulated. The other wedge in an identically deflected position is shown by the dotted lines.

With the information regarding the magnitude and direction of the contact forces produced by the deflecting wedges and the data regarding the pull-off forces of the particle interacting with the flat PDMS during the particle removal phase, it is possible to make predictions as to which particles will remain trapped in the selective adhesive and which will transfer over to the flat PDMS. Intuitively, smaller particles will be trapped lower in the channel, and will likely not even contact the flat PDMS during the transfer step. As the particles increase in size, however, a number of aspects of the interaction begin to change.

First, the particle will begin to deflect the wedges more and more as they engage higher up along the contact face. This will cause the contact normal vector to point more vertically as well as cause the friction vector to point more horizontally. The result of this is that the total sum of interaction forces generated by the wedges become less and less able to resist the vertically applied pull-off force generated by the flat PDMS sheet during the transfer step. Second, as particle sizes increase further, they will eventually be unable to generate a fully circular contact patch with the wedge, due to its limited height. Last, the amount of pull-off force generated during the transfer phase will increase as the particle radius increases, as shown in Equation 1. The combination of these three factors should lead larger particles to detach from the wedges while smaller ones are retained. The goal of the simulation, of course, is to determine the particle size at which this transition will occur.

Simulations were conducted for the above-mentioned model with particles of sizes ranging from 25-50 microns in radius. Both the contact pressure and contact status of each of the elements were logged such that post-processing of the data could determine all of the quantities mentioned in the previous section.

Figure 7:
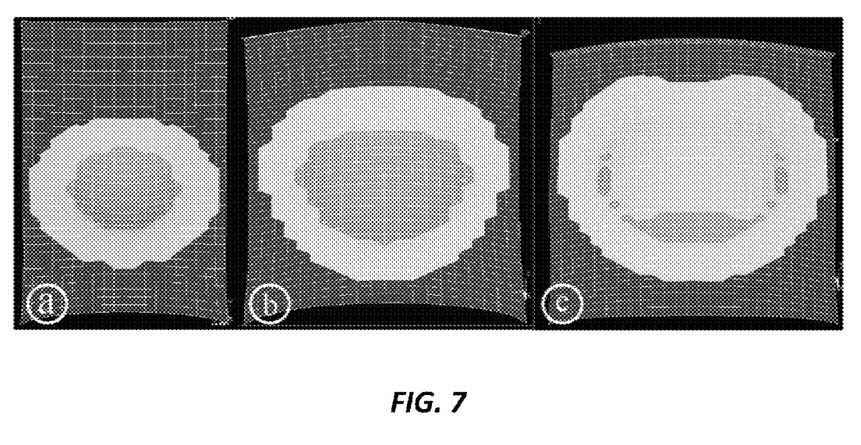
FIGS. 7a-7c show three front-on views of the actual contact area (dark) versus the near contact area (light) for different particle sizes, according to one embodiment of the invention.

The first behavioral difference that begins to occur as particle sizes increase is the shape of the contact patch. At smaller sizes, the particles interact with the wedges over a predictably circular contact region. An example of such a region can be seen in FIG. 7a, where the contact pressure distribution for a loaded particle of 25 µm radius is shown. As particle sizes increase further, the shape of this contact patch begins to change. The patch becomes less circular, approaching a semi-circular shape, as the contact between the particle and the wedge shifts more toward the bottom of the particle. This behavior can be seen in the contact pressure distribution of a particle of 45 µm radius, shown in FIG. 7b. The most noticeable change occurs at the two largest particle sizes tested, 47.5 µm and 50 µm radius. In the case of these sizes, the contact scheme changes dramatically, transitioning from a semi-circular shape to a thin, curved line of contact in the lower region with a smaller, circular contact region above it. The shape of the contact region is best illustrated in FIG. 7c, which is the contact patch for a particle with a 50 µm radius. Here, a sharp transition in the contact scheme can be clearly seen. With such a reduction contact area, the wedge is less capable of inhibiting the removal of the particles by the flat PDMS transfer sheet. Particles this size and above are predicted to detach from the micro-structure.

It is evident that significant changes occur in the mechanics of the particle-wedge interaction as the particle sizes increase. To illustrate this change, the actual contact patch area from the model was calculated by examining the number of contact elements found to be in contact with the particle and then multiplying by the size of the actual contact elements. While this simple calculation yielded data on the actual contact patch size, it was necessary to normalize the data because larger particles will generate larger contact patches when loaded similarly on arbitrary, flat surfaces. To accomplish this, the contact patch sizes were normalized by determining the percentage of area they represented as a fraction of the centerline cross-section of the particle.

Figure 8:
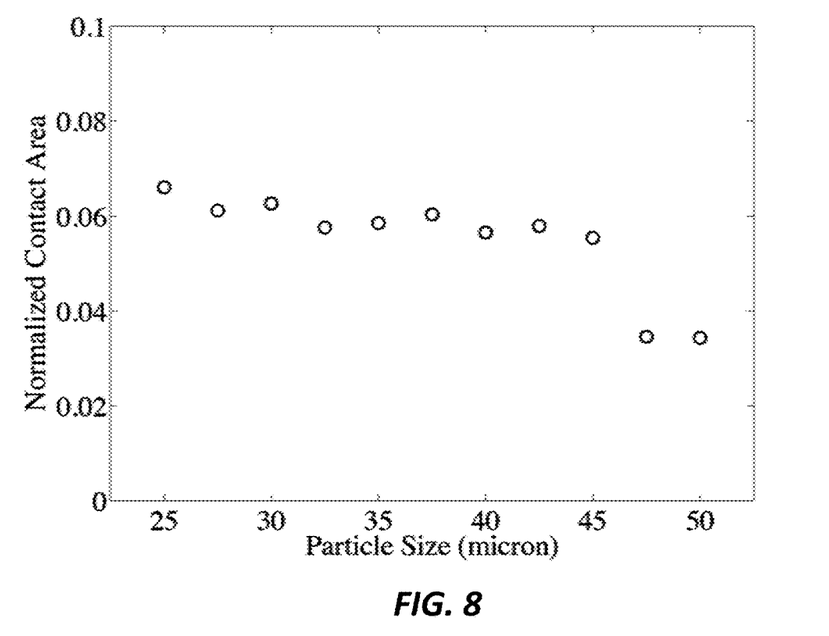
FIG. 8 shows a graph showing the normalized contact area between the particles and the wedges for particles of radius 25-50 μm, according to one embodiment of the invention.

The normalized, average contact patch size data clearly illustrate the significant change in contact area that happens at particle sizes above 47.5 µm in radius. This can be seen particularly clearly in FIG. 8. It is also important to note that the shape of the contact patch is persistent throughout the removal of the particle from the wedges and is not limited to highly loaded situations in which the particle sits deep within the wedge channel. Here FIG. 8 is a graph showing the normalized contact area between the particles and the wedges for particles of radius 25-50 µm. Normalization was accomplished by dividing actual contact area for each particle by the centerline cross section of a particle of the same size. It can be seen that the contact patch sizes are fairly consistent for particles with a radius of 25-45 µm, but particles between 47.5-50 µm in radius suffer a significant loss of real contact area due to the mechanics of the engagement with the micro-structure. This reduction in contact area leads to a reduction in friction by limiting the amount of material in sufficiently intimate contact for adhesion to occur.

This reduction in contact area should have a significant effect on the interaction between the two bodies. It has been demonstrated that the amount of frictional load present when rubber is sliding on glass, or vice versa, is proportional to the true area of contact. This is due to the fact that the friction is a result of the making and breaking of molecular sized bonds in the contact area between the rubber and the glass. Consequently, as the wedges begin to lose contact area with the particles due to their size, they will be increasingly incapable of resisting the pull-off force applied by the flat PDMS sheet during the transfer step of the selective adhesive process. However, due to the geometry of the loading situation, shown in a single load configuration in FIG. 6, the magnitude and direction of the normal and frictional forces acting on the particle will change over the course of the loading process. When the particles are in a position lower in the wedge channel, they will experience larger pinching forces by the opposing wedges. However, as they move higher in the channel, not only will they experience changes in the magnitudes of the forces, but also in the vectors along which the forces are applied, based on the elastic deformation of the wedges.

For each of the simulated sub-steps, an instance of the free body diagram shown in FIG. 6 can be calculated in which the contact forces between the wedge and the particle act along a vector from the point of maximum contact pressure through the center of the particle. The frictional forces are a linear multiple of the contact normal forces, but shifted 90 in the x-y plane, such that their direction opposes the application of the removal force from the particle's adhesion to the flat PDMS sheet. To determine the point at which the adhesion force with the flat PDMS transfer sheet would be sufficient to remove the particles from the micro-structure, the sub-step with the highest retentive forces was considered. This sub-step typically corresponded to the particle being loaded deeply into the wedge channel such that the normal forces, and thereby the frictional forces, were high and in a direction favorable for particle retention.

By this reasoning, if the adhesion force was sufficient to overcome the highest modeled retention forces from the micro-structure, it should detach, as subsequently applied forces are lower in magnitude as the particle slides out of the wedge channel. However, as was mentioned previously, the amount of friction generated for the interaction is based on the real area of contact between the two bodies. As such, a naive friction model in which the coefficient is static during the interaction would be insufficient. As an alternative, the frictional coefficient was scaled actively based on the amount of contact between the particle and the wedge.

It has been shown that smooth hemispherical asperities have a static coefficient of friction of approximately 1.4. Given the fact that the micro-structure, as well as the particles themselves, have some surfaces roughness that would serve to reduce contact area, thereby reducing friction, a frictional coefficient of 1 was assumed for an ideal, circular contact patch, like those seen in smaller particles. The frictional coefficient for larger particles was scaled down linearly with the reduction of contact area. In doing so, the effective frictional coefficient for the largest particles, 47.5 and 50 µm in radius, was reduced to approximately 0.6. The assumed frictional coefficients for each particle size, based on contact area, can be seen in FIG. 9. With the scaled friction coefficients, it is then possible to examine the y-component of the sum of forces applied on the particle just before slipping would occur, as well as the magnitude of the pull-off forces, predicted by the JKR model, in Equation 1. It is then predicted that if the magnitude of the pull-off force from the flat PDMS sheet exceeds the maximum retention forces applied by the micro-structure, that the particle will detach. The results of this analysis for particle 25-50 μm in radius can be seen in FIG. 10.

Figure 9:
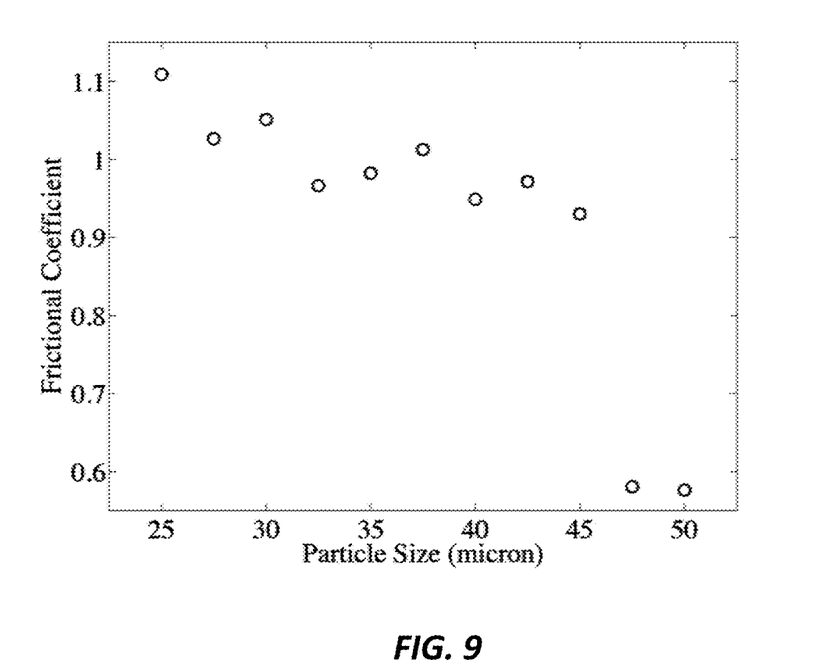
FIG. 9 shows a chart of assumed frictional coefficients for various particles based on their contact area with the micro-structure, according to one embodiment of the invention.

In FIG. 9, a chart of assumed frictional coefficients for various particles based on their contact area with the micro-structure is provided. Friction coefficients become smaller as particle sizes increase due to the loss of real contact area with the micro-structure. Eventually, particles of radius 47.5 μm and above show a significant loss of contact area and, hence, frictional coefficient.

Figure 10:
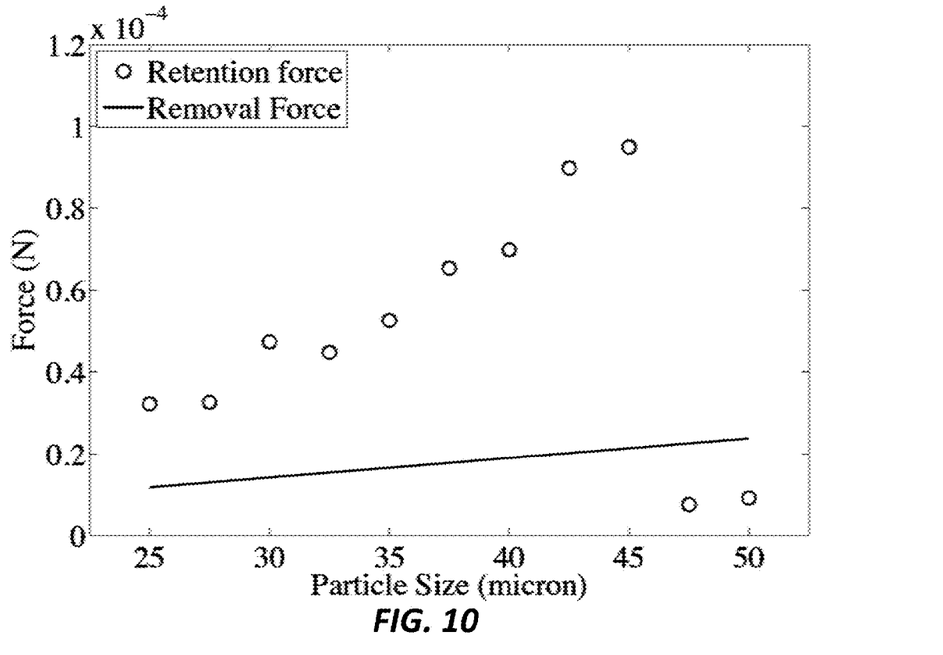
FIG. 10 shows a graph showing the forces involved in the particle transfer step, according to one embodiment of the invention.

In FIG. 10, a graph is provided showing the forces involved in the particle transfer step. The circular dots show the maximum magnitude of predicted retentive forces exerted by the micro-structure in the negative-y direction accounting for changes in area, pinch force, and force direction. The continuous line represents the magnitude of the adhesive force produced by the flat sheet of PDMS used in the transfer step, based on JKR predictions. As the contact area loss inhibits the amount of frictional force that can be generated, the micro-structure becomes less capable of retaining the particles. At particle radii of 47.5 and 50 μm, the adhesive forces with the transfer sheet are larger than the retentive forces applied by the wedges, thereby allowing for their removal during the transfer step.

It can be seen that for small particles, the possible retentive forces capable of being applied by the micro-structure in the event of attempted removal of the particles are greater than the adhesive forces predicted by the JKR model for contact with a flat PDMS sheet. Because of this, it is expected that particles of this size will remain entrapped within the micro-structure. However, due to the reduced actual contact area once the particles are sufficiently large, the overall retentive forces of the micro-structure are significantly diminished.

Furthermore, the predicted magnitudes of the adhesive forces generated in the transfer step increase monotonically with particle radius and are, for the largest of particles, greater in magnitude than the maximum frictional forces being exerted by the micro-structure. It should then be expected, based on this model, that the micro-structure will effectively trap particles below 45 μm in radius while allowing larger particles to be stripped away.

The procedure begins with a sample of the selective adhesive being prepared. A small rectangular sample is required, as particle counting is conducted via image processing of optical microscope images, and the field of view at the appropriate magnification, 20×, is limited to approximately 1 mm×0.7 mm. The sample is mounted on a rigid glass backing layer to aid it's exposure to contaminated surfaces. The contaminated surface is prepared by manually distributing particle size standards over a glass microscope slide. Standards of different size ranges are tested individually to ensure that much larger particles do not impede the proper loading of smaller particles into the feature channels. The particles tested were glass micro-spheres of size ranges 10-150 μm.

Once the sample and the contaminated surface were prepared, the sample is brought in to contact with the contaminated surface manually. Typically, the sample is capable of collecting 100% of the particles present on the contaminated area with which it comes in to contact. The contaminated sample then imaged at 20× magnification.

Next, the contaminated glass surface is replaced with a flat sheet of PDMS of approximated 400 μm thickness and the procedure begins over again. The contaminated sample is manually brought in to contact with the flat PDMS. The sample is then taken out of contact with the flat PDMS and is once again imaged at 20× magnification. The number and size of particles present on the adhesive before and after the transfer step are then examined via a custom image processing script and stored in a database. Once a sufficient number of test runs has been completed such that a large number of particles have been measured and counted, the capability of the material to sort particulates based on size was determined in a statistical manner.

Figure 11:
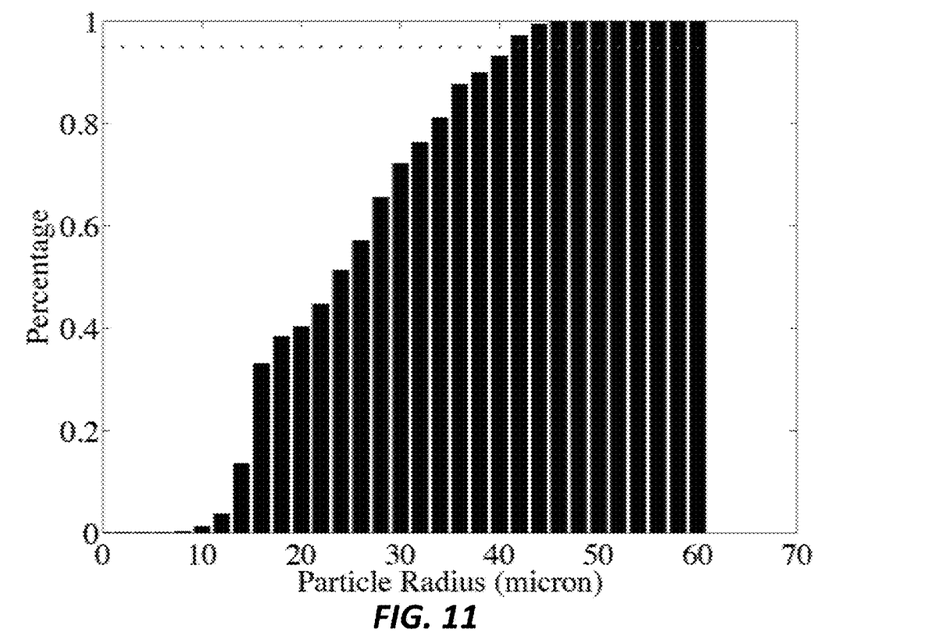
FIG. 11 shows a graph showing the performance of the second-generation selective adhesives, according to one embodiment of the invention.

FIG. 11 is a graph showing the performance of the second-generation selective adhesives. Each bar represents the percentage of particles retained by the adhesive, which were below the indicated size range. As was the case with the proof-of-concept testing, the figure represents the results of over 60 individual experiments involving over two thousand particles. In the figure, each bar represents the percentage of all particles that were arrested and that remained on the adhesive after the transfer step has been performed that were below the indicated size range. It can be seen that approximately 97% of the particles arrested by this adhesive are below 42-44 μm in radius. It can also be seen that 100% of the particles are below 46-48 μm in radius. This narrow transition region represents a significant performance improvement over the first generation of selective adhesive. In other words, the adhesives function as an effective low pass filter for particulate matter, similar to a sieve, but in an inverse manner, since wire mesh sieves are designed to be high pass filters, keeping large particles in the mesh while allowing others to pass through.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed:

1. A method of separating particles, comprising:
   a. exposing a selective PDMS adhesive to a particle-contaminated surface, wherein said selective PDMS adhesive captures particles present on said particle-contaminated surface to form a fouled selective PDMS adhesive, and
   b. exposing said fouled selective PDMS adhesive to a PDMS transfer sheet, wherein particles outside of a desired range are transferred over to said PDMS transfer sheet, wherein said fouled selective PDMS adhesive retains only said particles of a desired range.

2. The method of separating particles according to claim 1, wherein said PDMS transfer sheet comprises a bulk PDMS material.

3. The method of separating particles according to claim 2, wherein said bulk PDMS material comprises a flat sheet of said bulk PDMS material.

4. The method of separating particles according to claim 1, wherein said selective PDMS adhesive comprises a PDMS micro-structure, wherein said PDMS micro-structure comprises rows of wedge-shape features.

5. The method of separating particles according to claim 4, wherein said wedge-shape features have a height to base aspect ratio in a range of 1:1 to 5:1.

6. The method of separating particles according to claim 5, wherein said wedge-shape features comprise a height in a range of 1 μm to 1 mm.

7. The method of separating particles according to claim 4, wherein said wedge-shape features comprise a triangular cross-section selected from the group consisting of isosceles, right-isosceles, right, acute and equilateral.

8. The method of separating particles according to claim 4, wherein said wedge-shape features comprise a height in a range of 1 μm to 1 mm.

9. The method of separating particles according to claim 4, wherein said a base of said wedge-shape feature in one row is proximal to a base of said wedge-shape feature in an adjacent said row of said wedge-shape features.

10. The method of separating particles according to claim 9, wherein a separation between said adjacent bases of said wedge-shape features is in a range of 0 to 1 mm.

\* \* \* \* \*